United States Patent [19]

Goodwin

[11] Patent Number: 5,523,161

[45] Date of Patent: *Jun. 4, 1996

[54] WATER REPELLENT SURFACE TREATMENT WITH INTEGRATED PRIMER

[75] Inventor: George B. Goodwin, Mars, Pa.

[73] Assignee: PPG Industries, Inc., Pittsburgh, Pa.

[*] Notice: The term of this patent shall not extend beyond the expiration date of Pat. No. 5,328,768.

[21] Appl. No.: 363,803

[22] Filed: Dec. 27, 1994

Related U.S. Application Data

[63] Continuation-in-part of Ser. No. 220,353, Mar. 30, 1994, abandoned, which is a continuation-in-part of Ser. No. 589,235, Sep. 28, 1990, Pat. No. 5,308,705, which is a continuation-in-part of Ser. No. 503,587, Apr. 3, 1990, Pat. No. 4,983,459.

[51] Int. Cl.$^6$ ..................................................... B32B 27/00
[52] U.S. Cl. .................... 428/421; 427/322; 427/327; 427/384; 427/387; 427/397.7; 428/422; 428/429; 428/447; 428/450
[58] Field of Search .................................. 428/410, 421, 428/422, 426, 429, 442, 447, 450, 457, 688; 427/299, 301, 322, 327, 335, 355, 371, 427, 444, 402, 407.1, 407.2, 412.1, 389.7, 387, 384, 397.7, 388.1

[56] References Cited

U.S. PATENT DOCUMENTS

| | | | |
|---|---|---|---|
| 4,983,459 | 1/1991 | Franz et al. | 428/410 |
| 4,997,684 | 3/1991 | Franz et al. | 427/384 |
| 5,308,705 | 5/1994 | Franz et al. | 428/421 |
| 5,328,768 | 7/1994 | Goodwin | 428/428 |
| 5,368,892 | 11/1994 | Berquier | 427/299 |

FOREIGN PATENT DOCUMENTS

| | | |
|---|---|---|
| 0166363 | 1/1986 | European Pat. Off. . |
| 0476510 | 3/1992 | European Pat. Off. . |
| 02/311332 | 3/1991 | Japan . |

*Primary Examiner*—D. S. Nakarani
*Assistant Examiner*—H. Thi Le
*Attorney, Agent, or Firm*—Donald C. Lepiane

[57] ABSTRACT

A method and article are disclosed wherein a glass, plastic, metal, organic polymer coated substrate or inorganic coated substrate is provided with a durable non-wetting surface by treatment with a perfluoroalkylalkylsilane and a completely hydrolyzable silane.

19 Claims, No Drawings

WATER REPELLENT SURFACE TREATMENT WITH INTEGRATED PRIMER

CROSS REFERENCE TO RELATED APPLICATION

This application is a continuation-in-part of U.S. application Ser. No. 08/220,353 filed Mar. 30, 1994, now abandoned, which is a continuation-in-part of U.S. application Ser. No. 07/589,235 filed Sep. 28, 1990, now U. S. Pat. No. 5,308,705, which is a continuation-in-part of application Ser. No. 07/503,587 filed Apr. 3, 1990, which is now U.S. Pat. No. 4,983,459.

BACKGROUND

The present invention relates generally to the art of surface treatment and, more particularly, to the art of producing a water repellent surface on various substrates, and most particularly to improving the durability of such water repellent surfaces.

THE PRIOR ART

European Patent Application No. 92107814.3 (Publication Number 0 513 690 A2) of Yoneda et al. describes a surface-treated substrate having at least two treated surface layers wherein the first outermost layer is obtained by treatment with a compound forming a surface having a contact angle of at least 70° against water and the second underlayer is obtained by treatment with at least one reactive silane compound selected from isocyanate silane compounds and hydrolyzable silane compounds.

U.S. Pat. Nos. 4,983,459 and 4,997,684 to Franz et al. disclose an article and method respectively for providing a durable nonwetting surface on glass by treatment with a perfluoroalkylalkyl silane and a fluorinated olefin telomer.

In U.S. Pat. No. 5,308,705 Franz et al. describe providing nonwetting surface properties to substrates other than glass by treatment with a perfluoroalkylalkyl silane and a fluorinated olefin telomar.

In U.S. Pat. No. 5,328,768 Goodwin discloses a glass substrate the surface of which is treated with first a silica primer layer and second a perfluoroalkylalkyl silane.

SUMMARY OF THE INVENTION

The present invention provides a substrate surface with high water repellency and high lubricity. The durability of the water and dirt repellency of a substrate surface is improved by applying to the substrate surface a perfluoroalkylalkylsilane compound and a hydrolyzable silane compound. The hydrolyzable silane compound is a compound capable of hydrolyric condensation to form silica gel and functions as an integral primer compound. The surface treatment of the present invention provides enhanced durability to the water and dirt repellent surface without requiring a separate primer layer. High water repellency and lubricity are provided by perfluoroalkylalkylsilane. The hydrolyzable silane also provides for reactive drying of the solvent. The perfluoroalkylalkylsilane and hydrolyzable silane surface treatment of the present invention also provides enhanced abrasion resistance to the substrate surface. Increased resistance to humidity, ultraviolet radiation and mechanical abrasion are provided by the silane compound capable of hydrolytic condensation to silica gel.

DESCRIPTION OF THE PREFERRED EMBODIMENT

Durability of rain and soil repellency provided by application of a perfluoroalkylalkylsilane to a substrate surface is enhanced by mixing a silane or mixture of silanes capable of hydrolysis to silica gel with a perfluoroalkyl-alkylsilane prior to application. In accordance with the present invention, a mixture of a perfluoroalkylalkylsilane and silane or mixture of silanes capable of hydrolysis to silica gel is applied to the surface of glass to form a coating which is more durable than would have been formed without the silane or mixture of silanes capable of hydrolysis to silica gel.

Perfluoroalkylalkylsilane and hydrolyzable silane are applied to the surface of a substrate to produce the article of the present invention preferably as a colloidal suspension or solution, preferably in an aprotic solvent, preferably an alkane or mixture of alkanes, or a fluorinated solvent. The preferred solution of the present invention is applied to a substrate surface by any conventional technique such as dipping, flowing, wiping or spraying. The solvent is evaporated and the composition forms a durable, non-wetting, lubricating surface with improved abrasion resistance. The present invention provides the durability benefits of a primer without the additional step of applying a separate primer layer. The use of the completely hydrolyzable silane improves the humidity, ultraviolet light, and abrasion resistance of the silane surface treatment as measured by the Cleveland Condensing Cabinet, QUV (with FS40 or B313 lamps), and wet sled abrasion tests, indicating a longer useful product lifetime.

Preferred silanes capable of hydrolysis to silica gel have the general formula $SiX_4$, wherein X is a radical such as halogen, alkoxy, or acyl, preferably chloro, bromo, iodo, methoxy, ethoxy, and acetoxy. Preferred hydrolyzable silanes. include tetrachlorosilane and tetraacetoxysilane.

The silanes, $SIX_4$, serve two functions. One is to become part of the coating and impart resistance to weathering and abrasion. Another function is to dry the solvent. Typical hydrocarbon solvents can contain 50 to 200 ppm of water. Other solvents can be much higher in water content. For example, a solvent containing 200 ppm water would have enough water present to deactivate a perfluoroalkylalkylsilane at 0.5 weight percent concentration. The completely hydrolyzable silane is capable of eliminating or reducing the water content of the solvent prior to perfluoroalkylalkylsilane addition. Otherwise, water deactivation of the perfluoroalkylalkylsilane would lead to insufficient coating deposition or very poor durability.

Preferred perfluoroalkylalkylsilanes have the general formula $R_{m(R'_n)}SiX_{4-m-n}$, wherein R is a perfluoroalkylalkyl radical; m is typically one, n is typically zero or one, and m+n is less than 4; R' is a vinyl or an alkyl radical, preferably methyl, ethyl, vinyl or propyl; and X is preferably a radical such as halogen, acyloxy, and/or alkoxy. Preferred perfluoroalkyl moieties in the perfluoroalkylalkyl radicals range from $CF_3$ to $C_{30}F_{61}$, preferably $C_6F_{13}$ to $C_{18}F_{37}$, and most preferably $C_8F_{17}$ to $C_{12}F_{25}$; the alkyl moiety is preferably ethyl. R' is preferably methyl or ethyl. Preferred radicals for X include hydrolyzable chloro, bromo, iodo, methoxy, ethoxy and acetoxy radicals. Preferred perfluoroalkylalkylsilanes in accordance with the present invention include perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

These preferred perfluoroalkylethylsilanes appear to react with bonding sites at the substrate surface on a molecular basis. Strong surface bonding of the perfluoroalkylethylsilanes produces a durable substrate surface which exhibits a high contact angle with a drop of water, indicating high water repellency.

Suitable solvents include isopropanol, ethanol, hexane, heptane, mineral spirits, acetone, toluene and naphtha. Preferred solvents are alkanes or halogenated hydrocarbon solvents such as trichlorotrifluoroethane, and methylene chloride, and perfluorinated organic compounds such as perfluorocarbons. Concentrations of about 0.005 to 50, preferably about 0.05 to 5, percent by weight of silane are preferred. The solvent is preferably evaporated simply by drying in air at ambient temperature, or may be removed by wiping. The silanes may also be crosslinked to form a more durable coating. Preferably, curing is accomplished by heating the silane treated surface. Typically, curing temperatures of at least 150° F. (about 66° C.) are preferred, particularly above 200° F. (about 93° C.). A cure cycle of about 200° F. (about 93° C.) for about 30 minutes is suitable. Higher temperatures and shorter heating times may be more efficient. A cure cycle of 2 to 5 minutes at 400° to 500° F. (about 204° to 260° C.) may be preferred, particularly about 3 minutes at about 470° F. (about 243° C.). The substrate surfaces may, in the alternative, be contacted with perfluoroalkylalkylsilane in vapor form.

The contact angles recited herein are measured by the sessile drop method using a modified captive bubble indicator manufactured by Lord Manufacturing, Inc., equipped with Gaertner Scientific goniometer optics. The surface to be measured is placed in a horizontal position, facing upward, in front of a light source. A drop of water is placed on top of the surface in front of the light source so that the profile of the sessile drop can be viewed and the contact angle measured through the goniometer telescope equipped with circular protractor graduation.

Weathering chambers include the Cleveland Condensing Cabinet (CCC) and QUV Tester (products of The Q-Panel Company, Cleveland, Ohio). The CCC chamber was operated at a vapor temperature of 140° F. (60° C.) in an indoor ambient environment which resulted in constant water condensation on the test surface. The QUV Tester is operaned with cycles of 8 hours UV (either B313 or FS40 lamps) at black panel temperature of 65°–70° C. and 4 hours condensing humidity at 50° C.

The present invention will be further understood from the descriptions of specific examples which follow.

EXAMPLE I

A solution was prepared by mixing one gram of tetrachlorosilane and one gram of perfluoroalkylalkylsilane in 40 grams of trichlorotrifluoroethane (Freon® TF solvent, a product of DuPont). The perfluoroalkylalkylsilane comprised perfluoroalkylethyltrichlorosilanes, wherein the perfluoroalkyl moieties comprised primarily $C_6F_{13}$ to $C_{18}F_{37}$. For comparison, a control solution was mixed without the tetrachlorosilane. The solutions were applied to the atmosphere surface of 3.9 millimeter thick Solex® float glass (product of PPG Industries, Inc.) with a cotton pad. Coupons were cured at 200° F. (93° C.) for one hour. The excess silane was removed from the glass surfaces by solvent washing. Coupons were weathered in the CCC and QUV-FS40 weathering cabinets. Coating efficiency was measured by the contact angle of a sessile drop of water. The results are shown in the following table.

TABLE I

| CCC | | | OUV-FS40 | | |
|---|---|---|---|---|---|
| Hours | Primer | No Primer | Hours | Primer | No Primer |
| 0 | 105° | 105° | 0 | 107° | 106° |
| 496 | 102° | 87° | 319 | 106° | 102° |
| 927 | 67° | 60° | 1332 | 91° | 89° |
| 1669 | 49° | 40° | 2115 | 83° | 70° |
| | | | 2498 | 78° | 70° |
| | | | 2943 | 72° | 57° |

EXAMPLE II

Four solutions were prepared, each of which was 0.5 percent by weight perfluorohexylethyltrichlorosilane in Isopar L solvent (product of Exxon), a mixture of alkanes. The solutions had tetrachlorosilane concentrations of 0.0, 0.2, 0.45, and 0.79 percent by weight. The order of addition was Isopar L, tetrachlorosilane and perfluoroalkylethyltrichlorosilane to utilize the reactive drying of the solvent by the hydrolyzable tetrachlorosilane. These four solutions were coated on the tin surface of coupons of 0.182 inch (4.6 millimeter) thick clear float glass. Samples were tested in the CCC chamber. Coating efficiency was measured by the contact angle of a sessile drop of water. It can be seen in the following table that increasing the concentration of hydrolyzable silane within this range improves the durability of the perfluoroalkylalkylsilane surface treatment.

TABLE II

| | CCC Contact Angle (°) Primer Concentration (Percent by Weight) | | | |
|---|---|---|---|---|
| Hours | 0 | 0.2 | 0.45 | 0.79 |
| 0 | 115 | 115 | 114 | 114 |
| 122 | 81 | 89 | 105 | 105 |
| 284 | 54 | 65 | 77 | 81 |
| 475 | 36 | 44 | 58 | 69 |
| 642 | — | — | — | 47 |

EXAMPLE III

Four solutions were prepared, each of which was 2.5 percent by weight of the perfluoroalkylethyltrichlorosilane described in Example I and 2.5 percent by weight perfluoroalkylethylene in Fluorinert® FC-77 fluorocarbon solvent (a product of 3M). The solutions had tetrachlorosilane concentrations of 0.0, 1.0, 2.0 and 5.0 percent by weight. These four solutions were coated on the tin surface of coupons of 0.187 inch (4.7 millimeter) thick clear float glass. Coupons were cured at 300° F. (149° C.) for 15 minutes. Samples were tested in the CCC and QUVB-313 chambers. Coating efficiency was measured by contact angle of a sessile drop of water. Results are given in the following tables.

TABLE IIIA

| | CCC Contact Angle (°) Primer Concentration (Percent by Weight) | | | |
|---|---|---|---|---|
| Hours | 0 | 1.0 | 2.0 | 5.0 |
| 0 | 113 | 113 | 115 | 114 |

TABLE IIIA-continued

| | CCC Contact Angle (°) Primer Concentration (Percent by Weight) | | | |
|---|---|---|---|---|
| Hours | 0 | 1.0 | 2.0 | 5.0 |
| 162 | 95 | 109 | 114 | 112 |
| 348 | 73 | 81 | 98 | 93 |
| 684 | 31 | 41 | 43 | 34 |

TABLE IIIB

| | QUVB Contact Angle (°) Primer Concentration (Percent by Weight) | | | |
|---|---|---|---|---|
| Hours | 0 | 1.0 | 2.0 | 5.0 |
| 0 | 113 | 114 | 117 | 116 |
| 566 | 107 | 111 | 111 | 109 |
| 1375 | 82 | 95 | 95 | 87 |
| 2095 | 72 | 80 | 84 | 71 |

EXAMPLE IV

Solutions were prepared comprising 0.5 percent by weight perfluoroalkylethyltrichlorosilane with and without 0.5 percent by weight tetrachlorosilane in Isopar L solvent. Three perfluoroalkylethyltrichlorosilanes were employed: 1H,1H,2H,2H-tridecafluorooctyltrichlorosilane ("octyl"), 1H,1H,2H,2H-heptadecafluorodecyltrichlorosilane ("decyl"), or a mixture of perfluoroalkylethyltrichlorosilanes described in Example I. Tempered Solex® glass coupons and clear float glass coupons that had undergone a heat treatment which simulates a bending cycle (without bending significantly) were used in this study. The Solex glass was 0.157 inch (4 millimeters) thick, the clear float was 0.090 inch (2.3 millimeters) thick, and the tin surfaces were treated. Samples were tested in the QUVB-313 chamber and on a Wet Sled Abrader (Sheen Instruments LTD, Model 903). The Wet Sled Abrader was custom modified with an aluminum block which held two automotive windshield wiper blades. The wet sled abrasion test thus configured has an unusually high pressure wiper arm loading and is done partially wet and partially dry. These wiper strokes are much more severe than normally used in vehicles. Coating efficiency was measured by the contact angle of a sessile drop of water. The plus sign "+" refers to the presence of tetrachlorosilane in the coating formulations in the following tables.

TABLE IVA

| | OUVB-313 Contact Angle (°) | | | | | |
|---|---|---|---|---|---|---|
| Hours | octyl | octyl+ | decyl | decyl+ | mix | mix+ |
| 0 | 116 | 112 | 111 | 115 | 111 | 118 |
| 163 | 102 | 105 | 87 | 112 | 102 | 116 |
| 352 | 95 | 95 | 84 | 107 | 100 | 111 |
| 496 | 82 | 88 | 74 | 102 | 89 | 106 |
| 659 | 79 | 80 | 66 | 93 | 82 | 99 |
| 827 | 70 | 85 | 60 | 89 | 82 | 103 |

TABLE IVB

| | Wet Sled Abrasion Contact Angle (°) | | | | | |
|---|---|---|---|---|---|---|
| Cycles | octyl | octyl+ | decyl | decyl+ | mix | mix+ |
| 0 | 113 | 117 | 111 | 116 | 115 | 117 |
| 200* | 86 | 104 | 79 | 108 | 86 | 108 |
| 600* | 52 | 99 | 78 | 106 | 79 | 105 |
| 5000 | 35 | 84 | 47 | 91 | 82 | 92 |

*These data (at 200 and 600 cycles) were obtained with a slurry of 0.5 percent by weight Hi-Sil® 233 synthetic precipitated silica in water. The data for 5000 cycles were obtained using deionized water only.

EXAMPLE V

A control solution was prepared by mixing 95 grams of FC-77 solvent, 2.5 grams of perfluoroalkylethyltrichlorosilanes (perfluoroalkyl=$C_6F_{13}$ to $C_{18}F_{37}$), and 2.5 grams of perfluoroalkylethyleneo A primer-containing solution was prepared by mixing 188 grams of FC-77 solvent, 5 grams of perfluoroalkylethyltrichlorosilanes, 5.0 grams of perfluoroalkylethylene (perfluoroalkyl=$C_6F_{13}$ to $C_{18}F_{37}$), and 2 grams of tetrachlorosilane. A primer only solution was prepared from 198.4 grams of FC-77 solvent and 1.6 grams of tetrachlorosilane. These solutions were applied to the tin surface of 4.9 millimeter thick clear float glass with a cotton pad. Selected coupons were coated with primer solution prior to coating with either control solution or the solution containing perfluoroalkylalkylsilane and tetrachlorosilane. Coupons were cured at 300° F. (149° C.) for 15 minutes. The excess silane was removed from the glass surfaces by solvent washing. Coupons were weathered in the CCC. Coating efficiency was measured by the contact angle of a sessile drop of water.

TABLE V

| | CCC Contact Angle (°) | | | |
|---|---|---|---|---|
| | No primer layer | | Primer layer | |
| Hours | No integral primer | Integral primer | No integral primer | Integral primer |
| 0 | 114 | 114 | 113 | 114 |
| 232 | 116 | 116 | 117 | 115 |
| 398 | 100 | 110 | 109 | 110 |
| 590 | 49 | 78 | 75 | 86 |
| 918 | 29 | 39 | 31 | 41 |

The solution containing a silane hydrolyzable to silica led to more durable coatings whether or not the glass was preprimed with a silica layer separately with a solution of a hydrolyzable silane.

The above examples are offered to illustrate the present invention. Various perfluoroalkylalkylsilanes, hydrolyzable silanes, solvents and concentrations may be applied by any conventional technique, and optimally cured at suitable temperatures for adequate times to provide durable non-wetting surfaces to any of a variety of glass and plastic substrates, as well as other inorganic surfaces such as metals, ceramics, enamels, and metal or metal oxide films. The treated substrates of the present invention are especially suitable in automobile and aircraft parts, as well as in building components.

I claim:

1. An article comprising a substrate the surface of which is coated with a composition comprising a mixture of perfluoroalkylalkylsilane and completely hydrolyzable silane wherein the substrate is selected from the group consisting of glass, plastics, metals, organic polymer coated glass, organic polymer coated plastics, organic polymer coated metals, inorganic coated glass, inorganic coated plastics and inorganic coated metals wherein said perfluoroalkylalkylsilane is selected from compounds having the general formula $R_m(R'_n)SiX_{4-n-m}$, wherein R is a perfluoroalkylalkyl radical, R' is selected from the group consisting of vinyl and alkyl radicals, m is one, n is zero or one, m+n is less than 4, and X is a radical selected from the group consisting of halogen, alkoxy and acyl radicals.

2. An article according to claim 1, wherein said perfluoroalkylalkyl radical comprises aperfluoroalkyl moiety of the formulae $CF_3$ to $C_{30}F_{61}$.

3. An article according to claim 2, wherein said perfluoroalkyl moiety comprises $C_6F_{13}$ to $C_{18}F_{37}$.

4. An article according to claim 2, wherein X is selected from the group consisting of chloro, bromo, iodo, methoxy, ethoxy and acetoxy.

5. An article according to claims 3, wherein said perfluoroalkyl moiety comprises $C_8F_{17}$ to $C_{12}F_{25}$.

6. An article according to claim 1, wherein R' is selected from the group consisting of methyl, ethyl, vinyl and propyl.

7. An article according to claim 1, wherein said perfluoroalkylalkylsilane is selected from the group consisting of perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

8. An article according to claim 7, wherein said composition further comprises a fluorinated olefin.

9. An article according to claim 1, wherein said completely hydrolyzable silane comprises $SiX_4$, wherein X is selected from the group consisting of halogen, alkoxy and acyl radicals.

10. An article according to claim 1, further comprising a layer of silica between said substrate surface and said composition.

11. A method of producing a non-wetting surface on a substrate comprising contacting a surface of said substrate with a composition comprising a mixture of perfluoroalkylalkylsilane and completely hydrolyzable silane wherein said substrate is selected from the group consisting of glass, plastics, metals, organic polymer coated glass, organic polymer coated plastics, organic polymer coated metals, inorganic coated glass, inorganic coated plastics and inorganic coated metals wherein said perfluoroalkylalkylsilane is selected from compounds having the general formula $R_m(R'_n)SiX_{4-n-m}$, wherein R is a perfluoroalkylalkyl radical, R' is selected from the group consisting of vinyl and alkyl radicals, m is one, n is zero or one, m+n is less than 4, and X is a radical selected from the group consisting of halogen, alkoxy and acyl radicals.

12. A method according to claim 11, wherein said perfluoroalkylalkyl radical comprises a perfluoroalkyl moiety of the formulae $CF_3$ to $C_{30}F_{61}$.

13. A method according to claim 12, wherein said perfluoroalkyl moiety comprises $C_6F_{13}$ to $C_{18}F_{37}$.

14. A method according to claim 13, wherein said perfluoroalkyl moiety comprises $C_8F_{17}$ to $C_{12}F_{25}$.

15. A method according to claim 11, wherein R" is selected from the group consisting of methyl, ethyl, vinyl and propyl.

16. A method according to claim 11, wherein X is selected from the group consisting of chloro, bromo, iodo, methoxy, ethoxy and acetoxy.

17. A method according to claim 11, wherein said composition further comprises a fluorinated olefin.

18. A method according to claim 11, wherein the hydrolyzable silane comprises $SIX_4$, wherein X is selected from the group consisting of halogen, alkoxy and acyl radicals.

19. A method according to claim 11, wherein the substrate surface is first primed with a layer of silica.

* * * * *

UNITED STATES PATENT AND TRADEMARK OFFICE
CERTIFICATE OF CORRECTION

PATENT NO. : 5,523,161
DATED      : June 4, 1996
INVENTOR(S) : George B. Goodwin It is certified that error appears in the above-indentified patent and that said Letters Patent is hereby corrected as shown below:

Col. 7, Claim 1, line 5, after "metals" insert --,--.

Claim 1, line 8, delete "perliuo-" and insert --perfluo- --.

Claim 2, line 13, delete "aperfluoroalkyl" and insert --a perfluoroalkyl--.

Col. 8, Claim 11, line 9, after "metals" insert --,--.

Signed and Sealed this

Fourth Day of February, 1997

Attest:

BRUCE LEHMAN

Attesting Officer     Commissioner of Patents and Trademarks